United States Patent
Mann, III

(10) Patent No.: US 11,353,139 B1
(45) Date of Patent: Jun. 7, 2022

(54) APPARATUS FOR REDUCING NOISE AND CAVITATION IN VALVES

(71) Applicant: FISHER CONTROLS INTERNATIONAL LLC, Marshalltown, IA (US)

(72) Inventor: Julian Adin Mann, III, Ames, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 0 days.

(21) Appl. No.: 17/141,898

(22) Filed: Jan. 5, 2021

(51) Int. Cl.
*F16K 47/08* (2006.01)
*F16K 3/26* (2006.01)
*F16K 47/14* (2006.01)
*F16K 47/04* (2006.01)

(52) U.S. Cl.
CPC ............... *F16K 47/08* (2013.01); *F16K 3/26* (2013.01); *F16K 47/045* (2013.01); *F16K 47/14* (2013.01)

(58) Field of Classification Search
CPC ........ F16K 47/045; F16K 47/14; F16K 47/08; F16K 3/26
See application file for complete search history.

(56) References Cited

U.S. PATENT DOCUMENTS

| | | | | |
|---|---|---|---|---|
| 3,224,424 A | * | 12/1965 | Mennicken | F02M 1/00 123/586 |
| 3,722,854 A | * | 3/1973 | Parola | F16K 47/08 251/127 |
| 3,880,191 A | * | 4/1975 | Baumann | F16K 47/045 137/625.32 |
| 4,271,866 A | * | 6/1981 | Bey | F16K 5/0605 137/625.3 |
| 4,429,714 A | * | 2/1984 | Hughes | F16K 47/08 137/625.3 |
| 4,671,321 A | * | 6/1987 | Paetzel | F16K 3/26 137/625.3 |

(Continued)

OTHER PUBLICATIONS

Emerson, "Effective solutions for preventing control valve noise. Noise-Attenuation Technologies for Control Valves," Brochure, available at Fisher.com, May 2018, 15 pages.

(Continued)

*Primary Examiner* — Matthew W Jellett
*Assistant Examiner* — Christopher D Ballman
(74) *Attorney, Agent, or Firm* — Hanley, Flight & Zimmerman, LLC

(57) ABSTRACT

An example valve includes a valve body, a cage, and a plug. The valve body includes a fluid passageway extending between a fluid inlet and a fluid outlet. The cage and the plug are disposed in the fluid passageway. The cage includes a first annular sidewall having an inner layer and an outer layer that circumscribes the inner layer. The inner layer includes first openings extending through the inner layer. The outer layer includes second openings extending through the outer layer. The second openings are in fluid communication with the first openings. The second openings are smaller than the first openings. The plug includes a second annular sidewall circumscribed by the first annular sidewall. The second annular sidewall includes third openings extending through the second annular sidewall. The plug is movable relative to the cage to selectively place the third openings in fluid communication with the first openings.

19 Claims, 7 Drawing Sheets

(56) References Cited

U.S. PATENT DOCUMENTS

| | | | | |
|---|---|---|---|---|
| 5,287,889 | A * | 2/1994 | Leinen | F16K 5/0605 137/625.3 |
| 5,332,004 | A * | 7/1994 | Gethmann | F16K 5/0605 137/625.32 |
| 5,971,604 | A * | 10/1999 | Linga | B01F 15/0429 366/340 |
| 6,505,646 | B1 * | 1/2003 | Singleton | F16K 47/08 137/625.3 |
| 7,275,606 | B1 * | 10/2007 | Sims | E21B 21/06 137/547 |
| 7,320,340 | B2 * | 1/2008 | Bush | F16K 47/10 138/42 |
| 8,033,300 | B2 * | 10/2011 | McCarty | F16K 47/08 138/42 |
| 8,167,269 | B2 * | 5/2012 | Bell | F16K 47/08 251/325 |
| 8,366,070 | B2 * | 2/2013 | Rimboym | F16K 47/045 251/127 |
| 8,950,431 | B2 * | 2/2015 | Kim | F16K 47/08 137/625.33 |
| 9,404,591 | B2 * | 8/2016 | Yli-Koski | F16B 21/18 |
| 9,677,687 | B2 * | 6/2017 | Yli-Koski | F16L 55/02781 |
| 9,759,348 | B2 * | 9/2017 | Adams | F16K 47/08 |
| 9,897,232 | B2 * | 2/2018 | Harada | F16K 31/047 |
| 11,125,049 | B2 * | 9/2021 | Hoyle | E21B 34/025 |
| 2010/0258193 | A1 * | 10/2010 | Christenson | F16K 5/0605 137/1 |
| 2018/0112800 | A1 * | 4/2018 | Griffin, Jr. | F16K 47/14 |

OTHER PUBLICATIONS

Emerson, "Fisher™ Cavitrol™ III One-, Two-, and Three-Stage Trims," Cavitrol III Trims Product Bulletin 80.2:030, dated Sep. 2017, 12 pages.

Emerson, "Fisher™ WhisperFlo™ Aerodynamic Noise Attenuation Trim," WhisperFlo Trim Product Bulletin 80.3:010, dated Sep. 2017, 8 pages.

Emerson, "Fisher™ Whisper Trim™ III Cages," Whisper Trim III Product Bulletin 80.1:010, dated Sep. 2017, 8 pages.

Emerson, "Fisher™ Whisper Trim™ I Cage," Whisper Trim I Cage Product Bulletin 80.1:006, dated Oct. 2018, 4 pages.

* cited by examiner

APPARATUS FOR REDUCING NOISE AND CAVITATION IN VALVES

FIELD OF THE DISCLOSURE

This disclosure relates generally to valves and, more particularly, to apparatus for reducing noise and cavitation in valves.

BACKGROUND

Valves are used to control flow of a fluid through a conduit. Globe valves commonly include a valve cage with openings through which the fluid can flow when the valve is opened. As the fluid exits the openings of the cage, the fluid typically interacts with a relatively stationary or low velocity fluid at the outlet of the valve. Such interaction commonly generates noise and/or cavitation.

SUMMARY

An example valve disclosed herein includes a valve body including a fluid inlet, a fluid outlet, and a fluid passageway extending between the fluid inlet and the fluid outlet. A cage is disposed in the fluid passageway, the cage including a first annular sidewall having an inner layer and an outer layer. The outer layer circumscribes the inner layer. The inner layer includes first openings extending through the inner layer, and the outer layer includes second openings extending through the outer layer. The second openings are in fluid communication with the first openings, and the second openings are smaller than the first openings. A plug is disposed in the fluid passageway, the plug including a second annular sidewall circumscribed by the first annular sidewall. The second annular sidewall includes third openings extending through the second annular sidewall. The plug is movable relative to the cage to selectively place the third openings in fluid communication with the first openings.

An example apparatus disclosed herein includes a cage configured to be disposed in a fluid passageway of a valve, the fluid passageway extending between a fluid inlet of the valve and a fluid outlet of the valve. The cage includes a first annular sidewall having an inner layer and an outer layer, the outer layer circumscribing the inner layer. The inner layer includes first openings extending through the inner layer, and the outer layer includes second openings extending through the outer layer. The second openings are in fluid communication with the first openings, and the second openings are smaller than the first openings. A plug is configured to be disposed in the fluid passageway of the valve. The plug includes a second annular sidewall circumscribed by the first annular sidewall. The second annular sidewall includes third openings extending through the second annular sidewall. The plug is movable relative to the cage to selectively place the third openings in fluid communication with the first openings.

An example cage disclosed herein is configured to be disposed in a fluid passageway of a valve body. The cage includes a first annular sidewall configured to circumscribe a second annular sidewall of a plug. The plug is to be disposed in the valve body. The first annular sidewall has an inner layer and an outer layer, the outer layer circumscribing the inner layer. The inner layer includes first openings extending through the inner layer, and the outer layer includes second openings extending through the outer layer. The second openings are in fluid communication with the first openings, and the second openings are smaller than the first openings.

Figure 1:
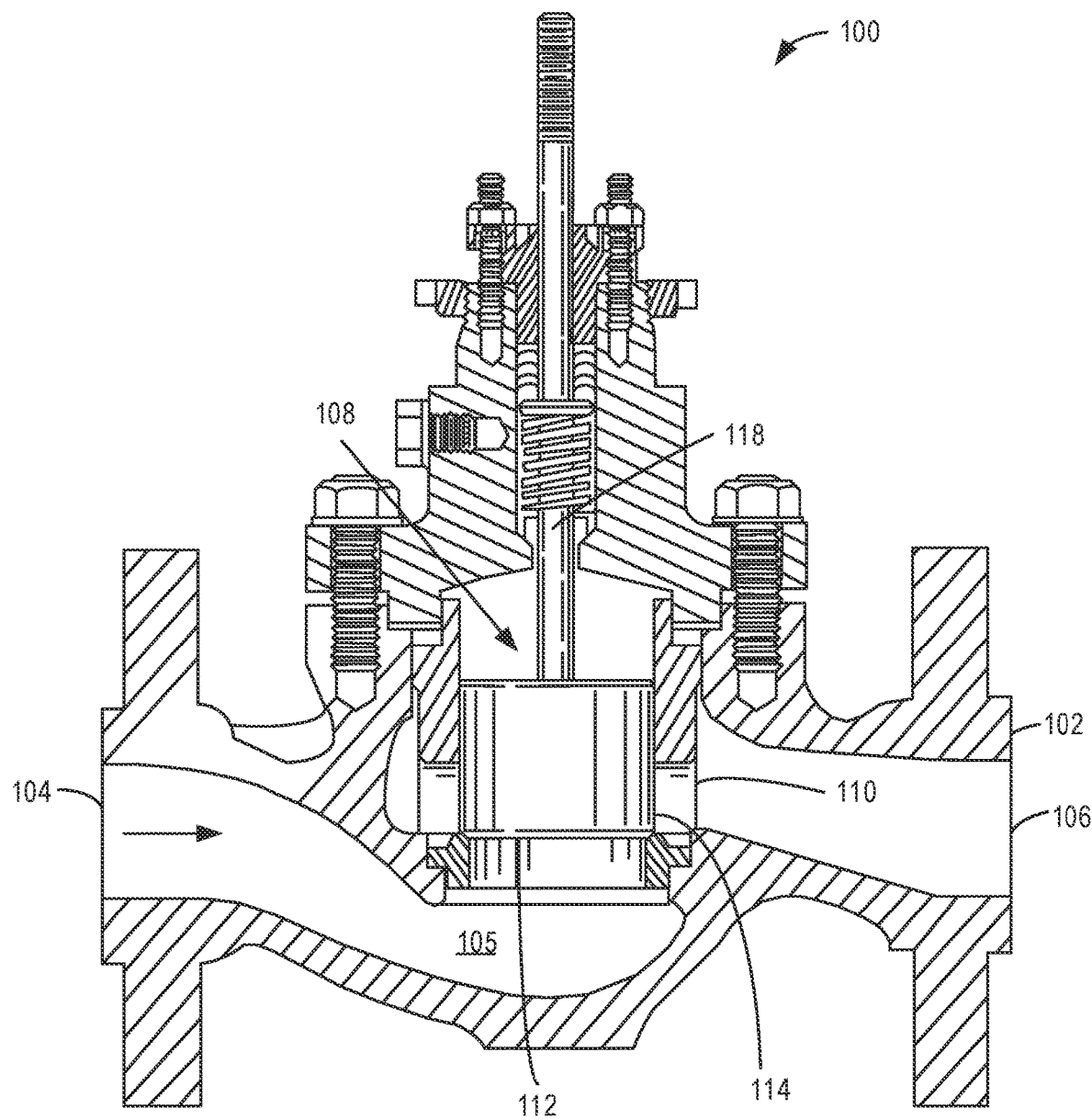
FIG. 1 illustrates a known globe valve in which examples disclosed herein can be implemented.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Valves are commonly implemented on a fluid conduit to control the flow of a fluid from a first location to a second location. When the valve is in a closed position, the valve prevents fluid in a high-pressure region at the valve inlet from flowing to a lower-pressure region at the valve outlet. Alternatively, when the valve is in an open position, the valve allows fluid to flow from the high-pressure region to the lower-pressure region. Opening and closing of the valve can be performed manually or via a command signal from a process control system communicatively coupled to the valve.

A trim assembly of a valve commonly includes a cage to reduce pressure of the fluid flowing through the valve. Typically, the cage includes openings through which the fluid travels when exiting the valve. In sliding stem valves, a plug is implemented within the cage to control fluid flow through the openings of the cage. The plug can move upward and downward with respect to the cage (e.g., along a central axis of the cage) and typically includes a solid sidewall (e.g., a sidewall without openings). In particular, the plug can move between a fully closed position and a fully open position. The plug blocks and/or prevents fluid flow through the cage in the fully closed position, and allows fluid flow through the cage in the fully open position. In some cases, placement of the plug in a partially open position can reduce a flow rate of the fluid compared to the flow rate of the fluid when the plug is in the fully open position.

A sudden pressure drop through the cage occurs when moving the plug from the closed position to the open position. In particular, the fluid is at a relatively high pressure upon entering the openings of the cage, and the fluid is at a reduced pressure upon exiting the openings. The fluid increases in velocity as the fluid travels through the openings. As high-velocity fluid exits the openings, the high-velocity fluid interacts with relatively stationary or low velocity fluid at the lower-pressure region. The interaction of fluids occurs at a shear layer between the high-velocity fluid and the stationary or low velocity fluid. In such cases, noise is caused by an increase in turbulence at the shear layer. Furthermore, the pressure drop during opening of the valve may cause cavitation in the valve. In such cases, bubbles in the fluid are formed and then subsequently collapse, which may result in damage to the body of the valve.

Examples disclosed herein reduce the occurrence of noise and/or cavitation during operation of the valve (e.g., globe valves, ball valves, etc.) by producing a gradual pressure drop across the plug and/or the cage. An example valve disclosed herein includes a cage having a first annular sidewall including an outer layer and an inner layer, with the outer layer circumscribing the inner layer. The inner layer includes first openings extending through the inner layer, and the outer layer includes second openings extending through the outer layer. The second openings are in fluid communication with the first openings, with the second openings being smaller than the first openings. As such, as the fluid flows through the first annular sidewall of the cage, the first and second openings produce a gradual pressure drop of the fluid, thereby reducing the turbulence and, thus, the noise and/or cavitation at an exit of the cage. In some examples, the outer layer of the first annular sidewall of the cage is structured as a lattice. Furthermore, examples disclosed herein implement a plug movable relative to the cage. The example plug includes a second annular sidewall circumscribed by the first annular sidewall of the cage. The plug includes third openings extending through the second annular sidewall. In some examples, the third openings have substantially the same size, shape, and/or spacing as the first openings of the cage.

In examples disclosed herein, the plug can move between a first position in which the first openings are overlapping and/or substantially aligned with the third openings, and a second position in which the first openings are not overlapping with the third openings. Fluid can flow through the plug and the cage when the plug is in the first position, and the plug prevents fluid from flowing through the cage when the plug is in the second position. Furthermore, the plug can control a flow rate of the fluid by controlling an area of overlap between the first and third openings. For example, increasing the area of overlap increases the flow rate, and reducing the area of overlap reduces the flow rate. Advantageously, examples disclosed herein can control pressure drop and/or flow rate of the fluid through a valve to reduce generation of noise and/or cavitation in the valve. While examples disclosed herein can be used in any type of valve, examples disclosed herein may be particularly useful in sliding stem control valves and rotary valves.

FIG. 1 illustrates a known globe valve 100 within which examples disclosed herein can be implemented. The globe valve 100 includes a valve body 102 having a fluid inlet 104 and a fluid outlet 106 connected by a fluid passageway 105. The globe valve 100 further includes a trim assembly 108 positioned inside the valve body 102 between the fluid inlet 104 and the fluid outlet 106. The trim assembly 108 includes a cage 110 and a seat 112. A plug (e.g., fluid control member) 114 of the globe valve 100 is slidably disposed in the cage 110, with the plug 114 being movable relative to the seat 112 to control fluid flow through the valve body 102. The plug 114 is coupled to an actuator (not shown) via a stem 118. The actuator moves the plug 114 upward in the valve body 102 (e.g., away from the seat 112) to open the globe valve 100 and allow fluid to flow from the fluid inlet 104 to the fluid outlet 106. Conversely, the actuator moves the plug 114 downward in the valve body 102 (e.g., toward the seat 112) to close the globe valve 100 and prevent fluid from flowing between the fluid inlet 104 and the fluid outlet 106. In some examples, the globe valve 100 can be partially opened or closed to control the flow rate of fluid through the globe valve 100. The actuator can be manually operated, or alternatively can be controlled via an electrical signal from a computer system coupled to the actuator.

The plug 114 of FIG. 1 has a solid (e.g., contiguous) surface, such that the fluid is prevented from flowing through a sidewall of the plug 114. As such, when the globe valve 100 moves from a closed state to an open state, a sudden pressure drop of fluid through the cage 110 can occur, such that high-velocity fluid interacts with stationary fluid at the exit of the cage 110. The interaction of fluids can generate noise and/or cavitation in the globe valve 100, which can reduce functionality of the globe valve 100. In particular, cavitation can cause damage to one or more components of the globe valve 100 such that the globe valve 100 may require frequent replacement and/or repair.

Figure 2:
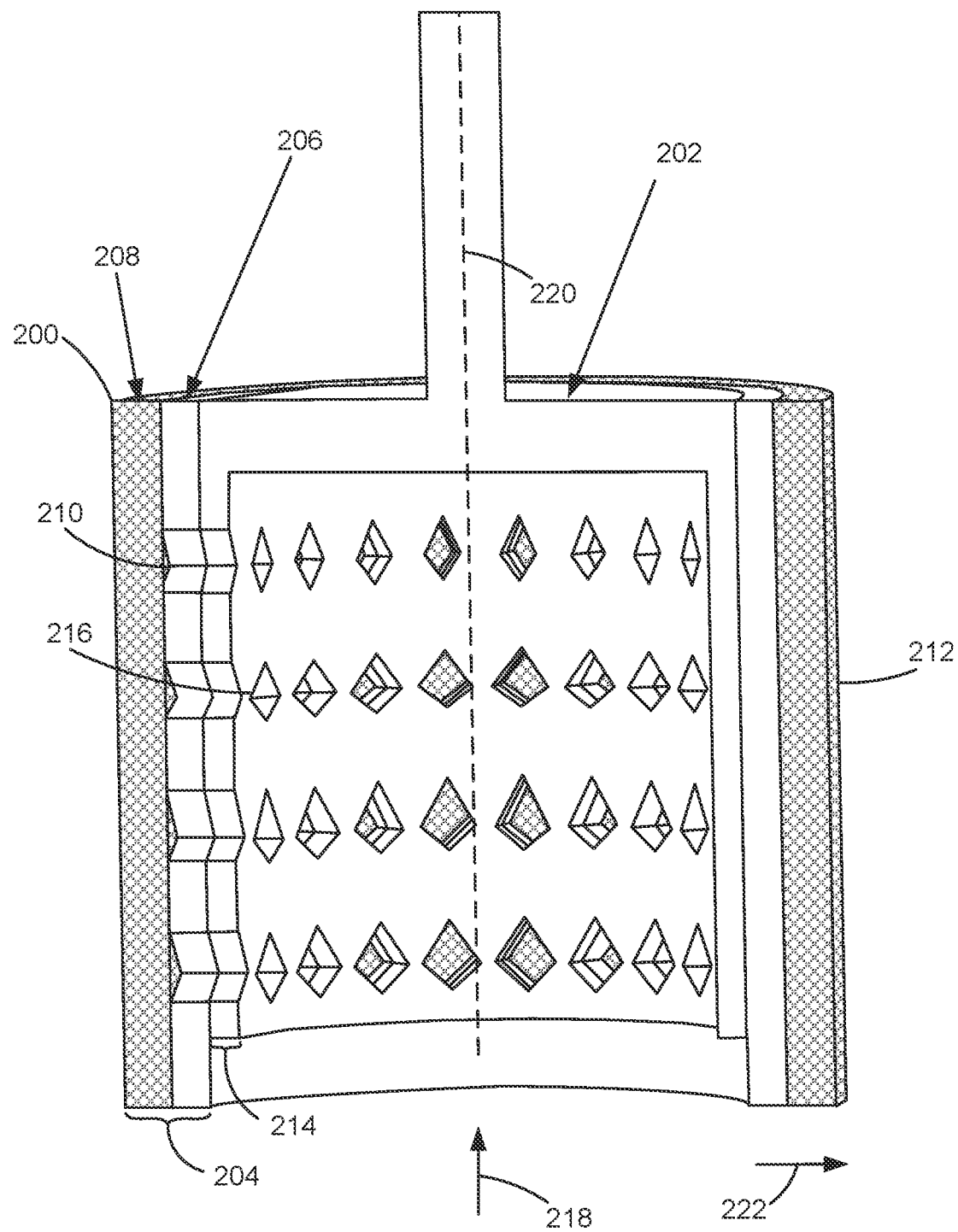
FIG. 2 is a cross-sectional view of an example cage and an example plug which can be implemented within the globe valve of FIG. 1 in accordance with teachings of this disclosure.

FIG. 2 is a cross-sectional view of an example cage 200 and an example plug 202 that can be implemented within the globe valve 100 of FIG. 1 in accordance with teachings of this disclosure. The example cage 200 and the example plug 202 of FIG. 2 respectively differ from the known cage 110 and known plug 114 of FIG. 1.

The cage 200 of FIG. 2 includes an example first annular sidewall 204 having an example inner layer 206 and an example outer layer 208, with the outer layer 208 circumscribing the inner layer 206. The inner layer 206 of the first annular sidewall 204 includes example first openings 210 disposed around a circumference of the inner layer 206, with the first openings 210 extending through the inner layer 206. The outer layer 208 of the first annular sidewall 204 includes example second openings 212 disposed around a circumference of the outer layer 208, with the second openings 212 extending through the outer layer 208. The second openings 212 of the outer layer 208 are in fluid communication with the first openings 210 of the inner layer 206. The second openings 212 of the outer layer 208 are respectively dimensioned to have a smaller size (e.g., a smaller cross-sectional area) in comparison to the size of the first openings 210 of the inner layer 206, as further described below.

In the illustrated example of FIG. 2, the outer layer 208 of the first annular sidewall 204 is fixedly coupled to and/or integrally formed with (e.g., via additive manufacturing) the inner layer 206 of the first annular sidewall 204. In other examples, the outer layer 208 of the first annular sidewall 204 is separable from the inner layer 206 of the first annular sidewall 204. In such other examples, the outer layer 208 of the first annular sidewall 204 can be held in a fixed position relative to the inner layer 206 of the first annular sidewall 204 when the inner layer 206 and the outer layer 208 are both positioned and/or seated within a valve (e.g., within the globe valve 100 of FIG. 1).

In some examples, the inner layer 206 and the outer layer 208 of the first annular sidewall 204 of the cage 200 can be constructed of metal (e.g., steel, aluminum, etc.). In other examples, the inner layer 206 and/or the outer layer 208 of the first annular sidewall 204 of the cage 200 can instead be constructed of a material other than metal. In the illustrated example of FIG. 2, the thickness of the outer layer 208 of the first annular sidewall 204 of the cage 200 is greater than the thickness of the inner layer 206 of the first annular sidewall 204 of the cage 200. In other examples, the thickness of the outer layer 208 of the first annular sidewall 204 of the cage 200 can instead be less than or substantially the same as the thickness of the inner layer 206 of the first annular sidewall 204 of the cage 200.

The plug 202 of FIG. 2 includes an example second annular sidewall 214. The second annular sidewall 214 of the plug 202 is configured to be circumscribed by the first annular sidewall 204 of the cage 200, with the second annular sidewall 214 of the plug 202 being slidable relative to and/or within the first annular sidewall 204 of the cage 200. The second annular sidewall 214 of the plug 202 includes example third openings 216 disposed around a circumference of the second annular sidewall 214, with the third openings 216 extending through the second annular sidewall 214.

In some examples, the second annular sidewall 214 of the plug 202 can be constructed of metal (e.g., steel, aluminum, etc.). In other examples, the second annular sidewall 214 of the plug 202 can instead be constructed of a material other than metal. In the illustrated example of FIG. 2, the thickness of the first annular sidewall 204 of the cage 200 is greater than the thickness of the second annular sidewall 214 of the plug 202. In other examples, the thickness of the first annular sidewall 204 of the cage 200 can instead be less than or substantially the same as the thickness of the second annular sidewall 214 of the plug 202.

In the illustrated example of FIG. 2, fluid enters an interior region of the plug 202 from an example direction (e.g., an upward direction) 218. The cage 200 is a fixed (e.g., stationary) component in the globe valve 100. The plug 202 is movable (e.g., slidable and/or rotatable) relative to the cage 200. For example, the plug 202 can move axially (e.g., along an example axis 220) between a first position (e.g., a fully open position) and a second position (e.g., a fully closed position). When the plug 202 moves relative to the cage 200, the third openings 216 formed in the second annular sidewall 214 of the plug 202 move relative to the first openings 210 formed in the inner layer 206 of the first annular sidewall 204 of the cage 200 such that the third openings 216 are selectively placed into fluid communication with the first openings 210. In some examples, the third openings 216 are placed into fluid communication with the first openings 210 in response to the plug 202 being moved from the second position toward and/or into the first position. Conversely, the third openings 216 are removed from being in fluid communication with the first openings 210 in response to the plug 202 being moved from the first position toward and/or into the second position For example.

In some examples, the first openings 210 and the third openings 216 partially or fully overlap when the plug 202 is in the first position, but do not overlap when the plug 202 is in the second position. In some such examples, the first openings 210 and the third openings 216 are substantially aligned when the plug 202 is in the first position. In the above-described examples, positioning the plug 202 at and/or moving the plug 202 into the first position causes the third openings 216 to be in fluid communication with the first openings 210 such that the fluid entering the interior region of the plug 202 can flow radially outward (e.g., in an example direction 222) through the second annular sidewall 214 of the plug 202 via the third openings 216, then through the inner layer 206 of the first annular sidewall 204 of the cage 200 via the first openings 210, and then through the outer layer 208 of the first annular sidewall 204 of the cage 200 via the second openings 212. Conversely, positioning the plug 202 at and/or moving the plug 202 into the second position causes the third openings 216 to not be in fluid communication with the first openings 210 such that the fluid entering the interior region of the plug 202 can flow through the second annular sidewall 214 of the plug 202 via the third openings 216, but is prevented from flowing into the first openings 210 formed in the inner layer 206 of the first annular sidewall 204 of the cage 200. In some examples, when the plug 202 is in the second position, a seal is formed at an interface between the second annular sidewall 214 of the plug 202 and the inner layer 206 of the first annular sidewall 204 of the cage 200 such that fluid does not pass between the first annular sidewall 204 and the second annular sidewall 214.

In the illustrated example of FIG. 2, the first openings 210 and the third openings 216 have a diamond cross-sectional shape. In other examples, the first openings 210 and/or the third openings 216 can instead have a different cross-sectional shape. For example, the first openings 210 and/or the third openings 216 can have an elliptical, circular, or rectangular cross-sectional shape. In the illustrated example of FIG. 2, the first openings 210 and the third openings 216 are of a uniform size and shape and are uniformly spaced across a surface of the cage 200 and/or the plug 202. In other examples, the size, shape, and/or spacing of the first openings 210 and/or the third openings 216 can be different. The number of the first openings 210 and the third openings 216, and/or the sizes of the first openings 210 and/or the third openings 216 can be increased or reduced to change the flow and/or pressure characteristics of the cage 200 and/or the plug 202. In the illustrated example of FIG. 2, the first openings 210 have substantially the same size, shape, and/or spacing as the third openings 216. In other examples, the first openings 210 can have a different size, shape, and/or spacing compared to the third openings 216. In some examples, the first openings 210 have a smaller cross-sectional dimension compared to the third openings 216.

In the illustrated example of FIG. 2, the outer layer 208 of the cage 200 can be configured as a lattice that defines the second openings 212 of the outer layer 208, with the cross-sectional dimension of the second openings 212 being less than a corresponding cross-sectional dimension of the first openings 210 and/or the third openings 216. In some examples, the cross-sectional dimension of the second openings 212 is less than twenty-five percent (25%) of the corresponding cross-sectional dimension of the first openings 210. In other examples, the cross-sectional dimension of the second openings 212 is less than ten percent (10%) of the corresponding cross-sectional dimension of the first openings 210. In still other examples, the cross-sectional dimension of the second openings 212 is less than five percent (5%) of the corresponding cross-sectional dimension of the first openings 210.

As discussed above, positioning the plug 202 at and/or moving the plug 202 into the first position causes the third openings 216 to be in fluid communication with the first openings 210 such that the fluid entering the interior region of the plug 202 can flow radially outward (e.g., in direction 222) through the second annular sidewall 214 of the plug 202 via the third openings 216, then through the inner layer 206 of the first annular sidewall 204 of the cage 200 via the first openings 210, and then through the outer layer 208 of the first annular sidewall 204 of the cage 200 via the second openings 212. By reducing the cross-sectional dimension from the first openings 210 to the second openings 212 in the direction 222, the cage 200 causes fluid flowing therethrough to have a gradual pressure drop as the fluid passes through the first annular sidewall 204. As such, the gradual pressure drop can reduce turbulence at an exit of the cage 200 to reduce noise and/or cavitation generated in a valve (e.g., the globe valve 100).

In some examples, the first annular sidewall 204 of the cage 200 and/or the second annular sidewall 214 of the plug 202 is/are constructed using additive manufacturing. As such, a shape, size, and/or spacing of the first openings 210, the second openings 212, and/or the third openings 216 can advantageously be customized based on a desired characteristic (e.g., flow rate, pressure drop) and/or application of a valve (e.g., the globe valve 100).

Figure 3:
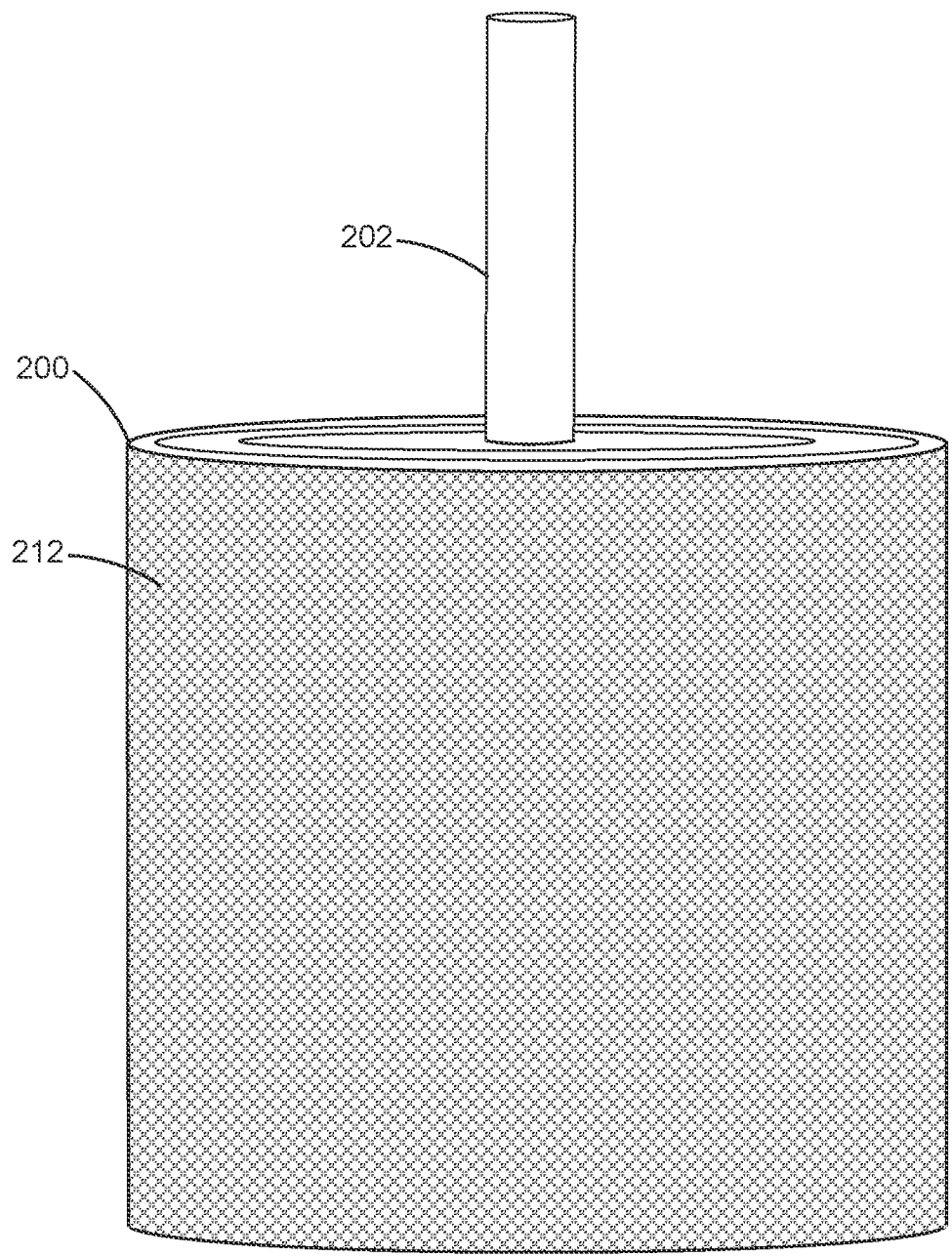
FIG. 3 is an external view of the cage and the plug of FIG. 2.

FIG. 3 is an external view of the cage 200 and the plug 202 of FIG. 2. In the illustrated example of FIG. 3, the outer layer 208 of the first annular sidewall 204 of the cage 200 is structured as a lattice that defines the second openings 212. As shown in FIG. 3, each of the second openings 212 has a square cross-sectional shape. In other examples, the cross-sectional shape of the second openings 212 can be a rectangle, a diamond, a parallelogram, etc. Alternatively, the second openings 212 can be defined by a hexagonal lattice or a triangular lattice.

Figure 4:
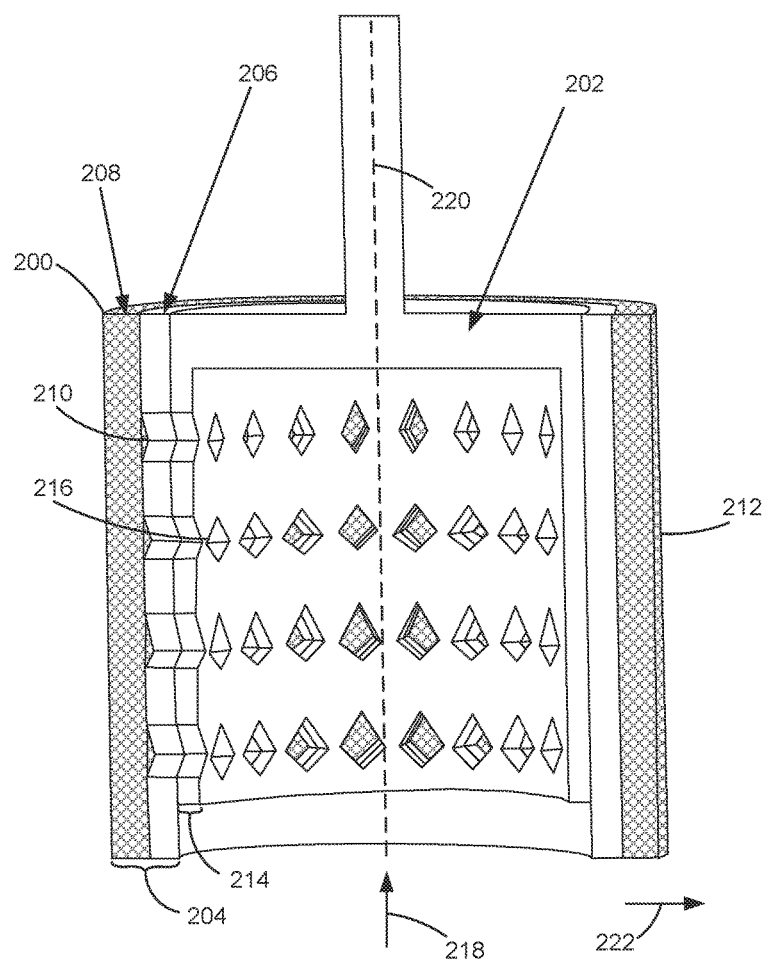
FIG. 4 illustrates the cage and the plug of FIGS. 2 and 3, with the plug shown in a fully open position.

FIG. 4 illustrates the cage 200 and the plug 202 of FIGS. 2 and 3, with the plug 202 shown in a fully open position. The plug 202 moves along the axis 220 relative to the cage 200 to the fully open position in which the first openings 210 of the first annular sidewall 204 and the third openings 216 of the second annular sidewall 214 are fully overlapping and/or substantially aligned. A flow rate of a fluid flowing through the first openings 210 and the third openings 216 is greater when the first openings 210 and the third openings 216 are fully overlapping and/or substantially aligned compared to when the first openings 210 and the third openings 216 are only partially overlapping and not substantially aligned). As such, the flow rate of the fluid can be increased by moving the plug 202 to the fully open position.

Figure 5:
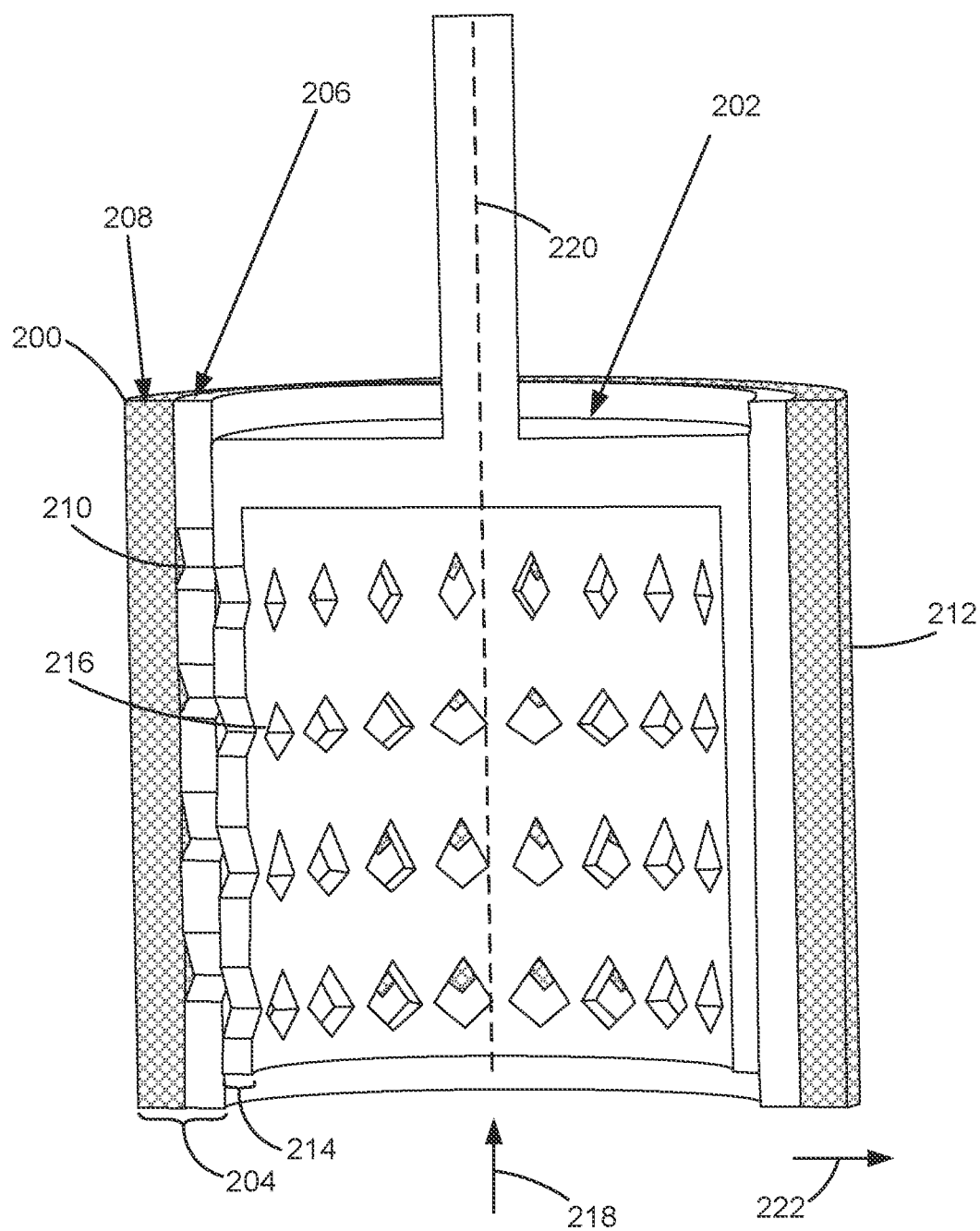
FIG. 5 illustrates the cage and the plug of FIGS. 2-4, with the plug shown in a partially open position.

FIG. 5. illustrates the cage 200 and the plug 202 of FIGS. 2-4, with the plug 202 shown in a partially open position. In the illustrated example of FIG. 5, the plug 202 has moved axially (e.g., downward) along the axis 220 compared to the plug 202 in the fully open position of FIG. 4. In particular, the plug 202 is positioned so that the third openings 216 of the plug 202 and the first openings 210 of the cage 200 are partially overlapping and not substantially aligned. In this example, approximately fifty percent (50%) of the cross-sectional area of the first openings 210 is covered. As such, as a result of a cross-sectional dimension of the first openings 210 being effectively reduced, the plug 202 being in the partially open position reduces a flow rate of fluid flowing through the plug 202 and the cage 200 compared to the plug 202 being in the fully open position.

Figure 6:
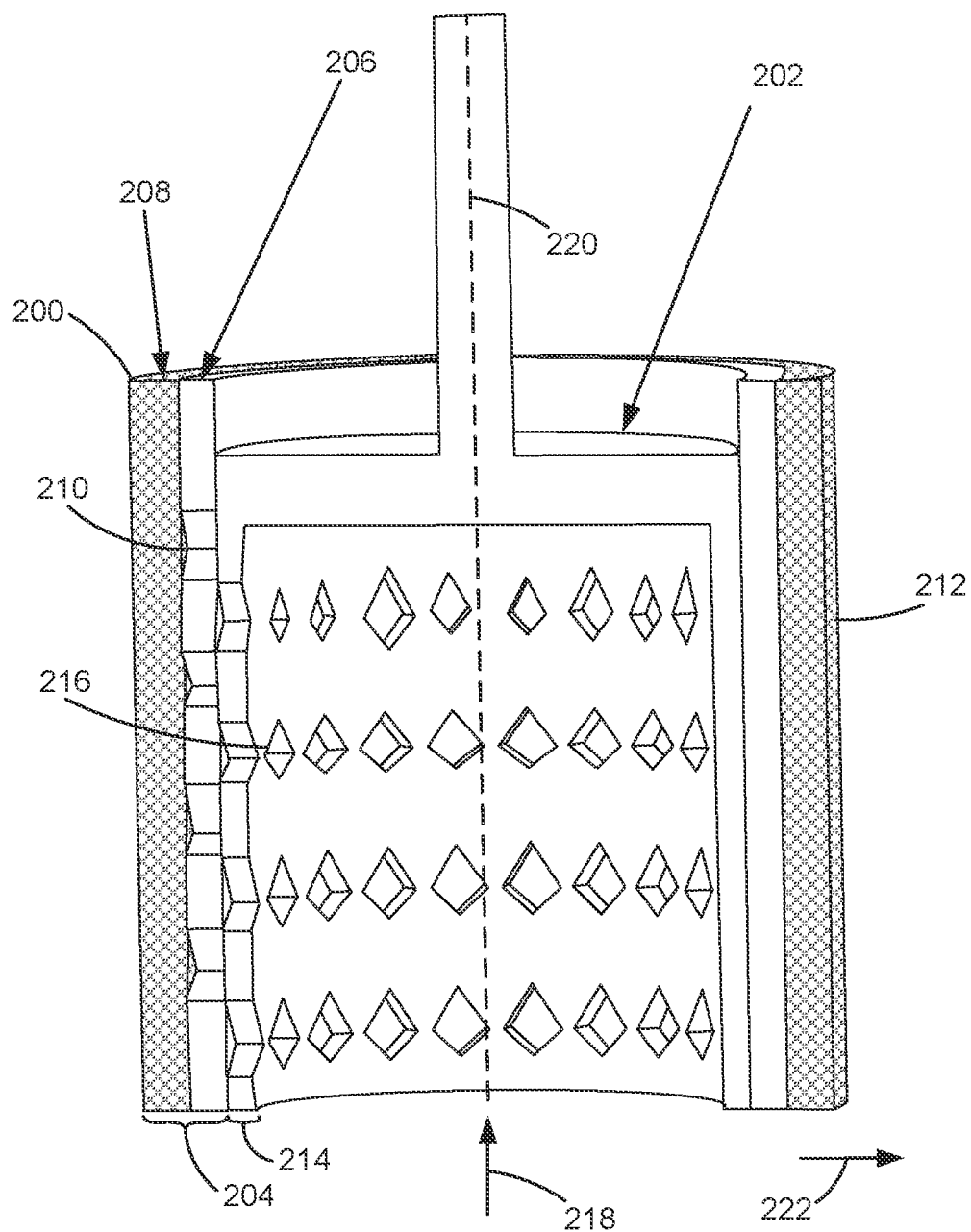
FIG. 6 illustrates the cage and the plug of FIGS. 2-5, with the plug shown in a fully closed position.

FIG. 6 illustrates the cage 200 and the plug 202 of FIGS. 2-5, with the plug 202 shown in a fully closed position. In the illustrated example of FIG. 6, the plug 202 has moved axially (e.g., downward) along the axis 220 compared to the plug 202 in the partially open position of FIG. 5. In particular, the plug 202 is positioned so that the third openings 216 of the plug 202 and the first openings 210 of the cage 200 do not overlap. As such, when the plug 202 is in the closed position, fluid entering the plug 202 is prevented from flowing radially outward in the direction 222 via the first openings 210 and, thus, the second openings 212.

In the illustrated example of FIG. 6, the plug 202 can return to the partially open position of FIG. 5 or the fully open position of FIG. 4 by moving (e.g., translating, sliding) upward relative to the cage 200 along the axis 220. As the plug 202 moves upward from the fully closed position to the fully open position, an uncovered area of the first openings 210 gradually increases. For example, the first openings 210 are zero percent (0%) uncovered when the plug 202 is in the fully closed position. The uncovered area increases gradually (e.g., to five percent (5%) uncovered, then to ten percent (10%) uncovered, etc.) as the plug 202 moves upward, with the uncovered area of the first openings 210 increasing until the plug 202 is in the fully open position and the first openings 210 are fully (e.g., one hundred percent (100%)) uncovered. As such, as the uncovered area increases, the flow rate of the fluid through the cage 200 similarly increases gradually. As a result, during opening of a valve incorporating the cage 200 and the plug 202 (e.g., the globe valve 100), turbulence generated at an exit of the cage 200 is reduced, thus reducing noise and/or cavitation in the valve.

Figure 7:
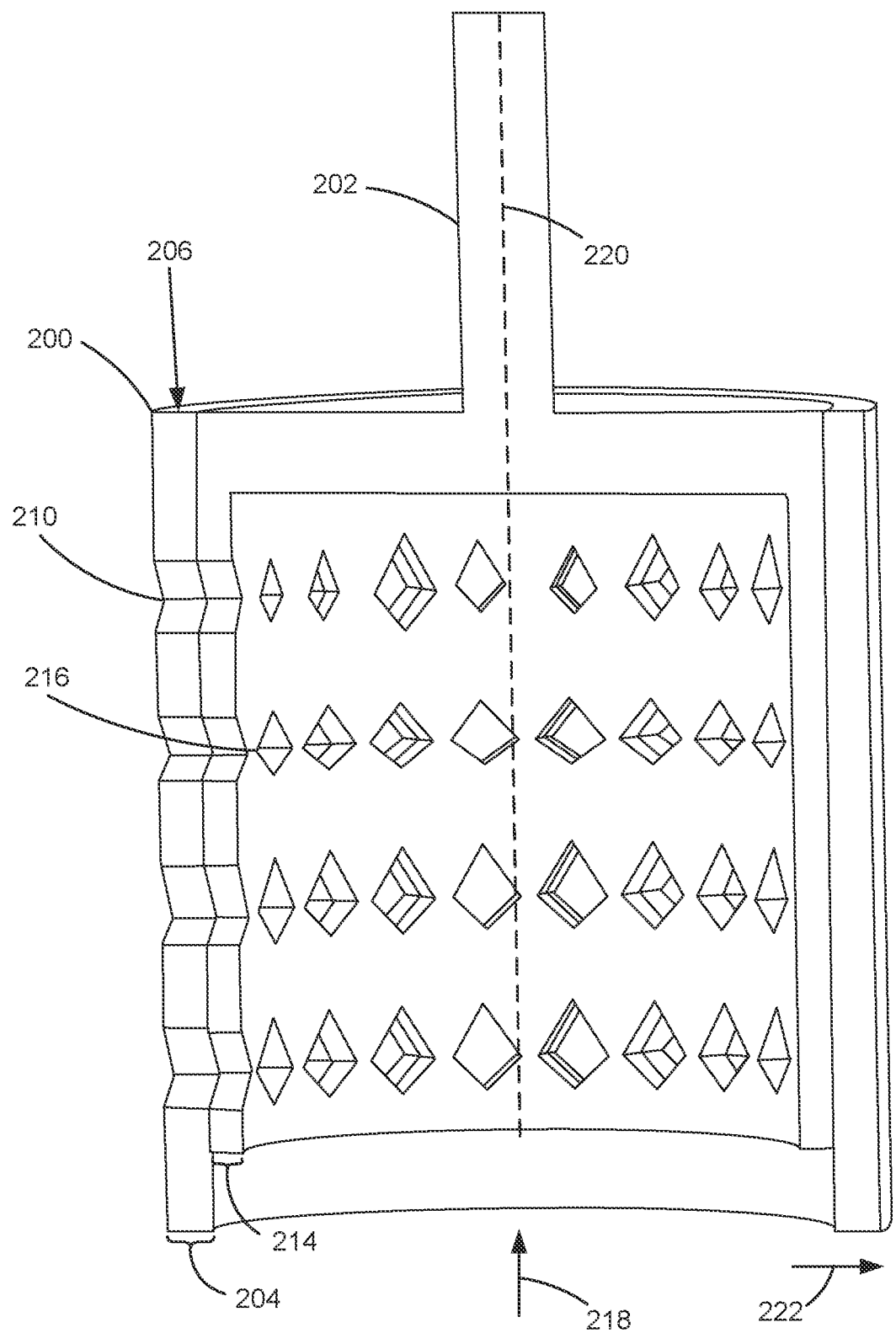
FIG. 7 illustrates the cage and the plug of FIGS. 2-6 with the outer layer of the cage omitted.

FIG. 7 illustrates the cage 200 and the plug 202 of FIGS. 2-6, with the outer layer 208 of the first annular sidewall 204 of the example cage 200 omitted. In this example, a pressure drop across the cage 200 is reduced compared to examples in which the outer layer 208 is implemented. Similar to the examples in FIGS. 4-6, the plug 202 in FIG. 7 can move relative to the cage 200 along the axis 220 to control a flow rate of a fluid through the first openings 210 and the third openings.

Alternatively, in other examples, the cage 200 can include one or more additional layers. For example, the cage 200 can include an intermediary layer positioned between the inner layer 206 and the outer layer 208 of the first annular sidewall 204 of the cage 200. In such examples, the first openings 210 of the inner layer 206 and the second openings 212 of the outer layer 208 can be in fluid communication with intervening openings formed in and extending through the intermediary layer, with the intervening openings having a cross-sectional dimension that is less than the cross-sectional dimension of the first openings 210 and greater than the cross-sectional dimension of the second openings 212. In some examples, the pressure drop across the first annular sidewall 204 of the cage 200 can be increased by implementing such an intermediary layer.

In the illustrated examples of FIGS. 4-7, the plug 202 moves between the fully open position and the closed position by travelling vertically along the axis 220. In other examples in which the cage 200 and the plug 202 are implemented on a rotary valve, the plug 202 can rotate about the axis 220 to cover and/or uncover the first openings 210. Additionally or alternatively, in some examples, the plug 202 implements the first annular sidewall 204 and the cage 200 implements the second annular sidewall 214. In such examples, the second annular sidewall 214 is fixed (e.g., stationary), and the first annular sidewall 204 is movable relative to the second annular sidewall 214.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

From the foregoing, it will be appreciated that example methods, apparatus and articles of manufacture have been disclosed that generate a gradual pressure drop of a fluid flowing through a valve and, thus, reduce noise and/or cavitation generated during operation of the valve.

Example methods, apparatus, systems, and articles of manufacture to reduce noise and/or cavitation in valves are disclosed herein. Further examples and combinations thereof include the following:

Example 1 includes a valve, including a valve body including a fluid inlet, a fluid outlet, and a fluid passageway extending between the fluid inlet and the fluid outlet, a cage disposed in the fluid passageway, the cage including a first annular sidewall having an inner layer and an outer layer, the outer layer circumscribing the inner layer, the inner layer including first openings extending through the inner layer, the outer layer including second openings extending through the outer layer, the second openings in fluid communication with the first openings, the second openings smaller than the first openings, and a plug disposed in the fluid passageway, the plug including a second annular sidewall circumscribed by the first annular sidewall, the second annular sidewall including third openings extending through the second annular sidewall, the plug movable relative to the cage to selectively place the third openings in fluid communication with the first openings.

Example 2 includes the valve of Example 1, where the outer layer is configured as a lattice, the lattice defining the second openings.

Example 3 includes the valve of Example 1, where the outer layer is fixedly coupled to the inner layer.

Example 4 includes the valve of Example 1, where the plug is movable relative to the cage in an axial direction, the plug movable between a first position in which the third openings overlap the first openings and a second position in which the third openings do not overlap the first openings.

Example 5 includes the valve of Example 4, where the fluid passageway is blocked when the plug is in the second position.

Example 6 includes the valve of Example 4, where the second annular sidewall and the inner layer of the first annular sidewall form a seal when the plug is in the second position.

Example 7 includes the valve of Example 4, where the third openings are aligned with the first openings when the plug is in the first position.

Example 8 includes the valve of Example 1, where a cross-sectional dimension of the second openings is less than twenty-five percent of a corresponding cross-sectional dimension of the first openings.

Example 9 includes the valve of Example 8, where the cross-sectional dimension of the second openings is less than ten percent of the corresponding cross-sectional dimension of the first openings.

Example 10 includes the valve of Example 9, where the cross-sectional dimension of the second openings is less than five percent of the corresponding cross-sectional dimension of the first openings.

Example 11 includes an apparatus, including a cage configured to be disposed in a fluid passageway of a valve, the fluid passageway extending between a fluid inlet of the valve and a fluid outlet of the valve, the cage including a first annular sidewall having an inner layer and an outer layer, the outer layer circumscribing the inner layer, the inner layer including first openings extending through the inner layer, the outer layer including second openings extending through the outer layer, the second openings in fluid communication with the first openings, the second openings smaller than the first openings, and a plug configured to be disposed in the fluid passageway of the valve, the plug including a second annular sidewall circumscribed by the first annular sidewall, the second annular sidewall including third openings extending through the second annular sidewall, the plug movable relative to the cage to selectively place the third openings in fluid communication with the first openings.

Example 12 includes the apparatus of Example 11, where the outer layer is configured as a lattice, the lattice defining the second openings.

Example 13 includes the apparatus of Example 11, where the outer layer is fixedly coupled to the inner layer.

Example 14 includes the apparatus of Example 11, where the plug is movable relative to the cage in an axial direction, the plug movable between a first position in which the third openings overlap the first openings and a second position in which the third openings do not overlap the first openings.

Example 15 includes the apparatus of Example 14, where the fluid passageway is blocked when the plug is in the second position.

Example 16 includes the apparatus of Example 14, where the second annular sidewall and the inner layer of the first annular sidewall form a seal when the plug is in the second position.

Example 17 includes the apparatus of Example 14, where the third openings are aligned with the first openings when the plug is in the first position.

Example 18 includes a cage configured to be disposed in a fluid passageway of a valve body. The example cage includes a first annular sidewall configured to circumscribe a second annular sidewall of a plug, the plug to be disposed in the valve body, the first annular sidewall having an inner layer and an outer layer, the outer layer circumscribing the inner layer, the inner layer including first openings extending through the inner layer, the outer layer including second openings extending through the outer layer, the second openings in fluid communication with the first openings, the second openings smaller than the first openings.

Example 19 includes the cage of Example 18, where the outer layer is configured as a lattice, the lattice defining the second openings.

Example 20 includes the cage of Example 18, where the outer layer is fixedly coupled to the inner layer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. A valve, comprising:
   a valve body including a fluid inlet, a fluid outlet, and a fluid passageway extending between the fluid inlet and the fluid outlet;
   a cage disposed in the fluid passageway, the cage including a first annular sidewall having an inner layer and an outer layer, the outer layer circumscribing the inner layer, the inner layer including first openings extending through the inner layer, the outer layer configured as a lattice including second openings extending through the outer layer, the second openings in fluid communication with the first openings, the second openings having a cross-sectional dimension that is less than twenty-five percent of a corresponding cross-sectional dimension of the first openings; and
   a plug disposed in the fluid passageway, the plug including a second annular sidewall circumscribed by the first annular sidewall, the second annular sidewall including third openings extending through the second annular sidewall, the third openings having a cross-sectional dimension that is substantially equal to the corresponding cross-sectional dimension of the first openings, the plug movable relative to the cage in an axial direction along a central axis of the cage to selectively place the third openings in fluid communication with the first openings.

2. The valve of claim 1, wherein the outer layer is fixedly coupled to the inner layer.

3. The valve of claim 1, wherein the plug is movable relative to the cage in the axial direction between a first position in which the third openings overlap the first openings and a second position in which the third openings do not overlap the first openings.

4. The valve of claim 3, wherein the fluid passageway is blocked when the plug is in the second position.

5. The valve of claim 3, wherein the second annular sidewall and the inner layer of the first annular sidewall form a seal when the plug is in the second position.

6. The valve of claim 3, wherein the third openings are aligned with the first openings when the plug is in the first position.

7. The valve of claim 3, wherein the fluid passageway is configured such that, when the plug is in the first position, a fluid is to flow from the fluid inlet into an interior region radially bounded by the second annular sidewall of the plug, then from the interior region in a radially-outward direction sequentially through (a) the third openings of the second annular sidewall of the plug, (b) the first openings of the inner layer of the first annular sidewall of the cage, and (c) the second openings of the outer layer of the first annular sidewall of the cage, and then into the fluid outlet.

8. The valve of claim 1, wherein the cross-sectional dimension of the second openings is less than ten percent of the corresponding cross-sectional dimension of the first openings.

9. The valve of claim 1, wherein the cross-sectional dimension of the second openings is less than five percent of the corresponding cross-sectional dimension of the first openings.

10. An apparatus, comprising:
    a cage configured to be disposed in a fluid passageway of a valve, the fluid passageway extending between a fluid inlet of the valve and a fluid outlet of the valve, the cage including a first annular sidewall having an inner layer and an outer layer, the outer layer circumscribing the inner layer, the inner layer including first openings extending through the inner layer, the outer layer configured as a lattice including second openings extending through the outer layer, the second openings in fluid communication with the first openings, the second openings having a cross-sectional dimension that is less than twenty-five percent of a corresponding cross-sectional dimension of the first openings; and
    a plug configured to be disposed in the fluid passageway of the valve, the plug including a second annular sidewall circumscribed by the first annular sidewall, the second annular sidewall including third openings extending through the second annular sidewall, the plug movable relative to the cage to selectively place the third openings in fluid communication with the first openings.

11. The apparatus of claim 10, wherein the outer layer is fixedly coupled to the inner layer.

12. The apparatus of claim 10, wherein the plug is movable relative to the cage in an axial direction, the plug movable between a first position in which the third openings overlap the first openings and a second position in which the third openings do not overlap the first openings.

13. The apparatus of claim 12, wherein the fluid passageway is blocked when the plug is in the second position.

14. The apparatus of claim 12, wherein the second annular sidewall and the inner layer of the first annular sidewall form a seal when the plug is in the second position.

15. The apparatus of claim 12, wherein the third openings are aligned with the first openings when the plug is in the first position.

16. The apparatus of claim 12, wherein the fluid passageway is configured such that, when the plug is in the first position, a fluid is to flow from the fluid inlet into an interior region radially bounded by the second annular sidewall of the plug, then from the interior region in a radially-outward direction sequentially through (a) the third openings of the second annular sidewall of the plug, (b) the first openings of the inner layer of the first annular sidewall of the cage, and (c) the second openings of the outer layer of the first annular sidewall of the cage, and then into the fluid outlet.

17. The apparatus of claim 10, wherein the third openings having a cross-sectional dimension that is substantially equal to the corresponding cross-sectional dimension of the first openings.

18. A cage configured to be disposed in a fluid passageway of a valve body, the cage comprising:
a first annular sidewall configured to circumscribe a second annular sidewall of a plug, the plug to be disposed in the valve body, the first annular sidewall having an inner layer and an outer layer, the outer layer circumscribing the inner layer, the inner layer including first openings extending through the inner layer, the outer layer configured as a lattice including second openings extending through the outer layer, the second openings in fluid communication with the first openings, the second openings having a cross-sectional dimension that is less than twenty-five percent of a corresponding cross-sectional dimension of the first openings.

19. The cage of claim 18, wherein the outer layer is fixedly coupled to the inner layer.

* * * * *